United States Patent
Spink et al.

(10) Patent No.: US 9,690,270 B2
(45) Date of Patent: Jun. 27, 2017

(54) METHOD AND APPARATUS FOR COOLING A DEVICE BASED ON PRODUCTIVITY OF THE DEVICE

(71) Applicant: Xerox Corporation, Norwalk, CT (US)

(72) Inventors: Timothy David Jonathan Spink, Welwyn (GB); David Berke, London (GB); Philip James Hambridge, Potters Barn (GB); Colin William Robert Hewitt, Letchworth Garden City (GB); Veena Kumari Saluja, Garden City (GB); Christopher Francios David Watts, St. Albans (GB); Lakshmi Sujatha Yaramsetti, Hatfield (GB)

(73) Assignee: Xerox Corporation, Norwalk, CT (US)

( * ) Notice: Subject to any disclaimer, the term of this patent is extended or adjusted under 35 U.S.C. 154(b) by 360 days.

(21) Appl. No.: 14/521,038

(22) Filed: Oct. 22, 2014

(65) Prior Publication Data
US 2016/0116922 A1   Apr. 28, 2016

(51) Int. Cl.
*G06F 19/00* (2011.01)
*G05B 15/02* (2006.01)
*B41J 29/377* (2006.01)
*G06F 1/20* (2006.01)

(52) U.S. Cl.
CPC ............ *G05B 15/02* (2013.01); *B41J 29/377* (2013.01); *G06F 1/20* (2013.01)

(58) Field of Classification Search
USPC .......................................................... 700/300
See application file for complete search history.

(56) References Cited

U.S. PATENT DOCUMENTS

| | | | | |
|---|---|---|---|---|
| 6,719,625 | B2* | 4/2004 | Federspiel | B61D 27/00 165/217 |
| 7,466,934 | B2* | 12/2008 | Chae | G03G 15/2039 399/69 |
| 2003/0173915 | A1* | 9/2003 | Lee | G06F 1/206 318/268 |
| 2006/0083535 | A1* | 4/2006 | Shepherd | G03G 21/206 399/92 |
| 2007/0215347 | A1* | 9/2007 | Tang | C09K 8/584 166/263 |
| 2011/0077796 | A1* | 3/2011 | Aklilu | G05D 23/1917 700/300 |
| 2012/0215359 | A1* | 8/2012 | Michael | G06F 1/206 700/275 |

* cited by examiner

*Primary Examiner* — Kidest Bahta

(57) ABSTRACT

A method, non-transitory computer readable medium, and apparatus for cooling a device are disclosed. For example, the method sets at least one accumulator increment rate, an accumulator decrement rate, at least one threshold value, and an accumulator value maximum based on empirical data associated with the device, tracks an accumulator value up to the accumulator value maximum based upon productivity of the device, wherein the accumulator value is adjusted based on an integral of the at least one accumulator increment rate and the accumulator decrement rate and operates a fan of the device based upon the accumulator value rising above the threshold value or falling below the threshold value.

18 Claims, 4 Drawing Sheets

METHOD AND APPARATUS FOR COOLING A DEVICE BASED ON PRODUCTIVITY OF THE DEVICE

The present disclosure relates generally to temperature control of a device and, more particularly, to a method and apparatus for cooling a device based on the productivity of the device.

BACKGROUND

Some devices generate a lot of heat when operating. Heat generated within the device is unwanted and can cause other internal modules to degrade or fail. Some devices incorporate fans to move the heat externally. However, fans consume a relatively large amount of energy. In the past, the fan would simply be turned on when the device begins operating and turned off when the device stops operating. However, due to the relatively large amount of energy consumption and the desire to make devices more efficient and environmentally friendly ("green"), the simple on-off approach is not efficient enough.

One solution has been to include a thermostat or a temperature monitor/sensor inside of the device. The temperature sensor may provide feedback that can be used to selectively control when to turn on the fan and when to turn off the fan.

However, using a thermostat or temperature sensor inside the device adds costs to the device. For example, an interface to the processor is required, additional wiring, adding a location for receiving the temperature sensor, and the like, all add costs to the device in addition to the temperature sensor itself.

SUMMARY

According to aspects illustrated herein, there are provided a method, a non-transitory computer readable medium, and an apparatus for cooling a device. One disclosed feature of the embodiments is a method that sets at least one accumulator increment rate, an accumulator decrement rate, at least one threshold value, and an accumulator value maximum based on empirical data associated with the device, tracks an accumulator value up to the accumulator value maximum based upon productivity of the device, wherein the accumulator value is adjusted based on an integral of the at least one accumulator increment rate and the accumulator decrement rate and operates a fan of the device based upon the accumulator value rising above the threshold value or falling below the threshold value.

Another disclosed feature of the embodiments is a non-transitory computer-readable medium storing a plurality of instructions which, when executed by a processor, cause the processor to perform operations that sets at least one accumulator increment rate, an accumulator decrement rate, at least one threshold value, and an accumulator value maximum based on empirical data associated with the device, tracks an accumulator value up to the accumulator value maximum based upon productivity of the device, wherein the accumulator value is adjusted based on an integral of the at least one accumulator increment rate and the accumulator decrement rate and operates a fan of the device based upon the accumulator value rising above the threshold value or falling below the threshold value.

Another disclosed feature of the embodiments is an apparatus comprising a processor and a computer readable medium storing a plurality of instructions which, when executed by the processor, cause the processor to perform operations that sets at least one accumulator increment rate, an accumulator decrement rate, at least one threshold value and an accumulator value maximum based on empirical data associated with the device, tracks an accumulator value up to the accumulator value maximum based upon productivity of the device, wherein the accumulator value is adjusted based on an integral of the at least one accumulator increment rate and the accumulator decrement rate and operates a fan of the device based upon the accumulator value rising above the threshold value or falling below the threshold value.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer-readable medium for cooling a device. As discussed above, some devices that generate a lot of heat when operating and the heat is generally unwanted and cause degradation or failure of modules within the devices. A fan can be used, but currently there is no efficient way of controlling the fan without increasing the cost of the device.

For example, in a printer a lot of the internal heat may be produced by the fuser. The fuser is a device that melts the toner onto the paper. The fuser reaches very high temperatures (e.g., up to 200 degrees Celsius (° C.)). High temperatures can cause internal modules or parts within the printer to fail or degrade sooner than normal.

Embodiments of the present disclosure provide a way to control operation of a fan to control temperature within a device (e.g., a printer) based on the productivity of the device. Although the examples and embodiments herein are described using a printer, it should be noted that the methods discussed herein may be used for any type of device that uses an internal fan for cooling.

In one embodiment, by controlling the fan based on productivity of a printer, no additional interfaces, wiring or installation of a temperature sensor is required. As a result, the overall cost of the device is kept relatively low by avoiding the need for the additional components associated with the temperature sensor and used by current methods for controlling temperature and operation of the fan within a device.

Figure 1:
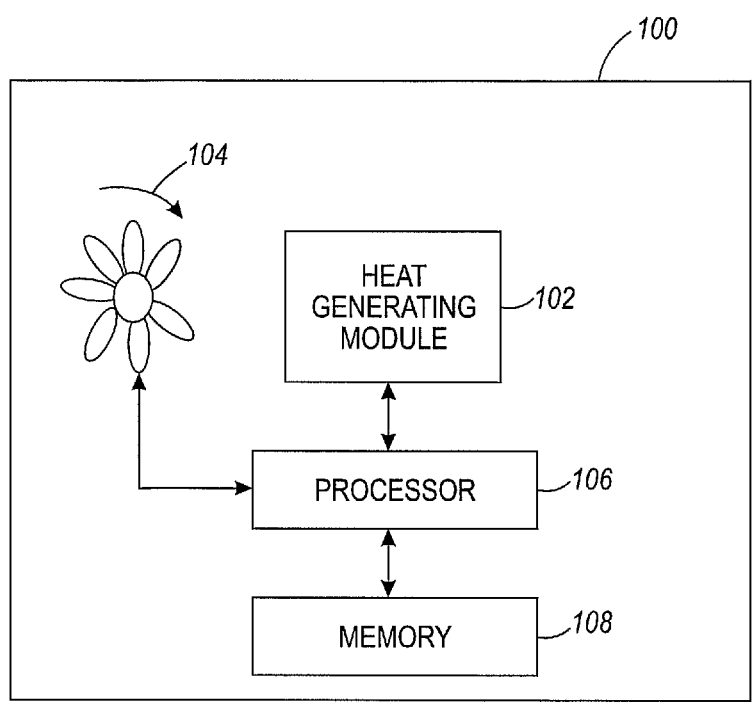
FIG. 1 illustrates a block diagram of a device of the present disclosure.

FIG. 1 illustrates an example device 100 of the present disclosure. In one embodiment, the device 100 may include a heat generating module 102, a fan 104, a processor 106 and a memory 108. In one embodiment, the device 100 may be a printer (e.g., a laser printer, photo copier, and the like) and the heat generating module 102 may be a fuser in the printer that melts the toner onto the paper. As noted above, the fuser in a printer may generate a large amount of heat that needs to be dissipated by a fan to control the temperature of the printer.

In one embodiment, the heat generate module 102 and the fan 104 may be in communication with the processor 106. The processor 106 may control operation of the fan (e.g., turning on or off) based on productivity of the device 100 or specifically the heat generating module 102.

In one embodiment, empirical data about the device 100 may be collected and the empirical data may be used to calculate at least one accumulator increment rate, an accumulator decrement rate, a threshold value and an accumulator value maximum. The accumulator increment rate, the accumulator decrement rate, the threshold value, the accumulator value maximum, the current accumulator value, a accumulator minimum value, and the like, may be stored in the memory 108 and used by the processor 106 for tracking the accumulator value and determining when to turn the fan 104 on and off.

In one embodiment, empirical data may comprise a temperature of an environment that the device is located (e.g., the temperature of the office the device is located at), a heating rate of the device during operation in the environment, a cooling rate of the device when the device is idle in the environment, an effective time period of operation of the fan, and the like. For example, the device may be a printer that typically operates in an environment at 25° C. Empirical data regarding how quickly the printer heats up or a rate of temperature change per sheet of paper being printed or during an idle state in the environment at 25° C. may be collected. In one embodiment, empirical data may be collected at various different ranges of environmental operating temperatures such that the appropriate accumulator increment rate and accumulator decrement rate may be used depending on the temperature of the environment the printer's location. The rate of temperature change may be used to obtain the accumulator increment rate and the accumulator decrement rate. In one embodiment, the accumulator increment rate adds to the accumulator value and the accumulator decrement rate subtracts from the accumulator value.

For example, the printer may print one sheet of paper per second and it may be determined that at one sheet of paper per second, the printer has an accumulator increment rate of one increment per second. In one embodiment, different productivity options may each have a different accumulator increment rate. For example, the printer may have different printing speeds. Thus, when printing at one sheet per second, the accumulator increment rate may be one increment per second, but when printing at five sheets per second the accumulator increment rate may be 2 increments per second. In another example, when performing double sided copies or prints, the accumulator increment rate may be 3 increments per second, and so forth. It should be noted that the productivity options described above are only examples and other productivity options not mentioned above may be within the scope of the present disclosure.

In one embodiment, the accumulator increment rate may be set based on the productivity option that is selected. Using the above example, if single sided printing at one sheet per second is selected, the method 300 may set the accumulator increment rate to one increment per second.

In one embodiment, the printer may be monitored to see how quickly the printer cools. For example, it may be measured that the temperature cools at a rate that is equivalent to 0.5 decrements per second.

In one embodiment, the threshold value may be a value that determines when the fan should be turned on within the device. The threshold value may be set to any value depending on a type of device, a particular application, an operating environment, and the like. For example, the threshold value may be set to 50 in one example.

In one embodiment, the accumulator value maximum may be based on how long a fan's operation is effective at cooling the heat generating module within the device. For example, using the above example, it may be determined that a fan has effectiveness for 30 seconds. Thus, the accumulator value maximum may be set to 65 for a printer having an accumulator decrement rate of 0.5 per second. In other words, accumulator value maximum may be considered to be a time where keeping the fan on longer would either not be necessarily effective or restricted by other constraints (e.g., more power usage) In one embodiment, the minimum accumulator value may be zero.

The accumulator increment rate, the accumulator decrement rate, the threshold value and the accumulator value maximum may be used as a correlation of a temperature within the device to control operation of the fan without the need of a temperature sensor. For example, FIG. 2 provides a chart 200 that illustrates how operation of the fan is controlled by tracking an integral of the accumulator increment rate and the accumulator decrement rate over a period of time.

In one embodiment, the integral may be defined as a sum of the accumulator increment rate and the accumulator decrement rate at a point in time or over a period of time. For example, at a point in time the integral of the accumulator increment rate and the accumulator decrement rate may be calculated to determine if the accumulator value should be incremented or decremented. For example, if the accumulator increment rate is 1.0 per second and the accumulator decrement rate is 0.5 per second at the point in time, then at that point in time the integral would be 0.5 and the accumulator increment rate would be incremented or increased by 0.5.

Figure 2:
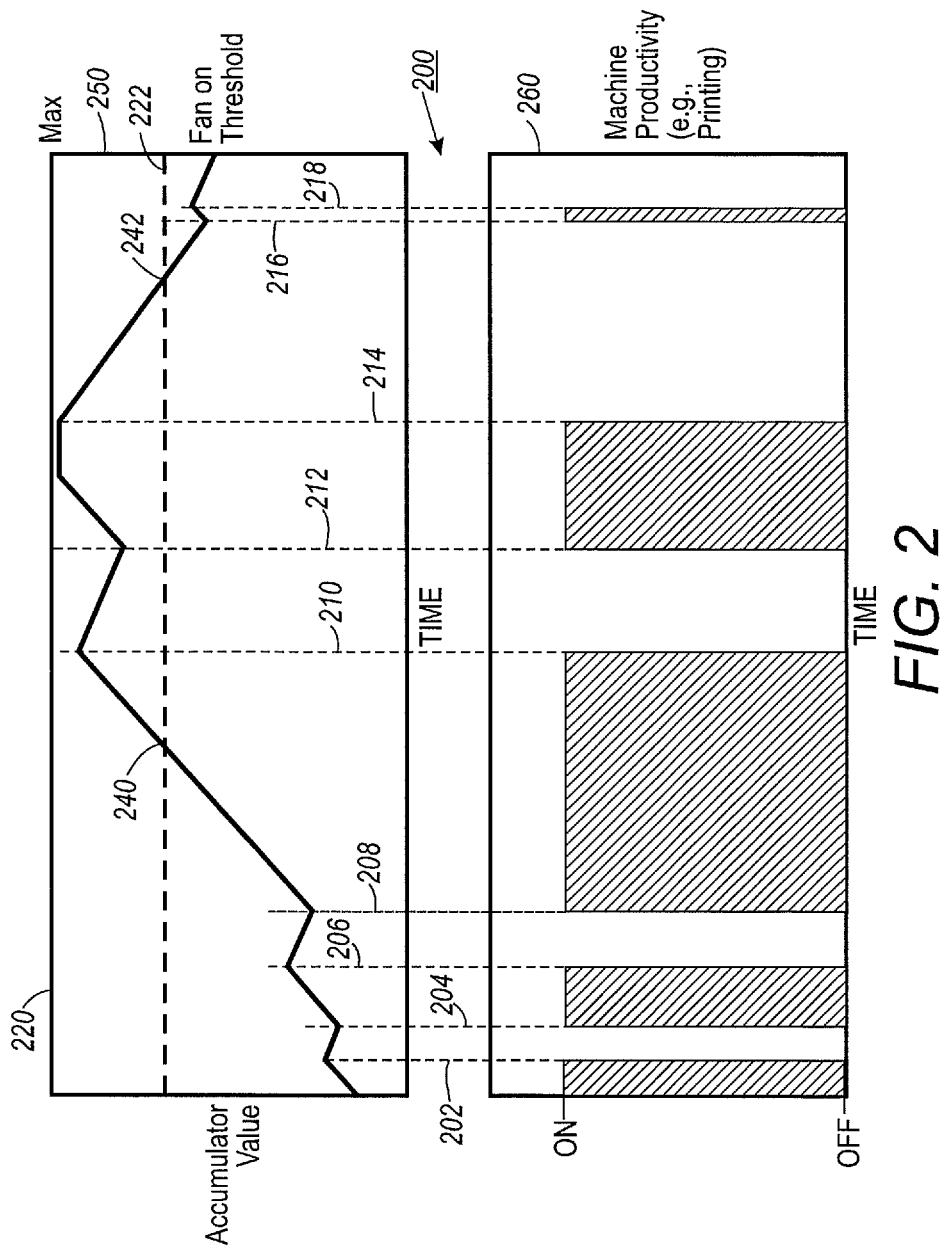
FIG. 2 illustrates an example timing chart of the present disclosure.

However, as illustrated in FIG. 2, the integral is also tracked over a period of time. In other words, the accumulator value over time depends on the previous accumulator values. For example, if the accumulator value at time t was 24 and the integral of the accumulator increment rate and the accumulator decrement rate at time t+1 is 0.5, the accumulator value at time t+1 would be 24.5 and not simply 0.5.

In one embodiment, the operation of the fan 104 is controlled based on the accumulator value and not operation of the device 100. For example, in FIG. 2, a graph 260 illustrates when the device 100 is operating over a period of time. In the graph 260, the value goes from low when the device 100 is off to high when the device is turned on as time progresses from left to right.

A graph 250 illustrates the accumulator value over a period of time that corresponds in time to the graph 260. The graph 250 illustrates a line 220 that represents the accumulator value maximum and a dashed line 222 that represents the threshold value. The accumulator value varies from an accumulator value minimum of zero to the accumulator value maximum.

As shown in the graph 250, the accumulator value is integrated over a period of time. In addition, the accumulator value is continually traced over time and does not go to zero each time the device 100 is turned on or off or transitions from an operating state to an idle state.

For example, at time 202, the device 100 is turned off and the accumulator value begins to decrement at the accumulator decrement rate. At time 204, the device 100 is turned on and the accumulator value begins to increment at the accumulator increment rate. This process repeats at time 206 and at time 208. After time 208, the device 100 remains on for a period of time and the accumulator value crosses the threshold value line 222 at time 240. At time 240, the processor 106 may control the fan 104 to turn on.

At time 210, the device 100 turns off. However, since the accumulator value is still above the threshold value line 222, the fan 104 would remain on. In other words, the operation of the fan is controlled based on the accumulator value irrespective of whether the device 100 is turned on or off or is in an operation state or an idle state. In addition, it should be noted that the accumulator value is continuously tracked and does not reset to zero each time the device 100 is turned on or off. Rather, the accumulator value is an integral of the accumulator increment rate and the accumulator decrement rate over time.

Referring back to FIG. 2, at time 212, the device 100 is turned on. As shown in FIG. 2, the accumulator value rises again until it reaches the accumulator value maximum line 220, at which point the accumulator value levels off until the device 100 is turned off at time 214. At time 214, the accumulator value begins to decrement at the accumulator decrement rate while the device is off or in an idle state. At time 242, the accumulator value falls below the threshold value line 222 and the fan 104 is turned off.

At time 216, the device 100 is turned on again briefly and the accumulator value begins to increment. At time 218, the device 100 is turned off again and the accumulator value begins to decrement. It should be noted that the fan 104 does not turn on even though the device was turned on since the accumulator value does not exceed the threshold value line 222.

It should also be noted that the accumulator value resumes incrementing from the accumulator value at time t−1 immediately before the device 100 is turned on. In other words, when the device 100 is turned off, the accumulator value does not reset to zero. Rather, the accumulator value is continuously tracked and the accumulator value resumes incrementing or decrementing from its current value whenever the device 100 is turned on or off based on productivity of the device 100.

As noted above, accumulator increment rate may be dynamically changed during operation of the device 100 depending on a productivity option that is selected. For example, although the slope of increment for all of the lines in FIG. 2 appears to be similar, the slope of increment (i.e., the accumulator increment rate) may be steeper or shallower depending on the productivity option that is selected. For example, at time 208, a faster printing rate of five sheets per second may be selected for the device 100. As a result, the accumulator increment rate may be changed from 1.0 increment per second to 2.0 increments per second while the accumulator decrement rate remains at −0.5 decrements per second. Thus, the integral of the accumulator increment rate and the accumulator decrement rate at each point in time would be 1.5 per second. As a result, the accumulator value between time 208 and 210 may rise faster and the slope would be steeper than currently shown in FIG. 2.

In one embodiment, the threshold value line 222 may be set to any desired level depending on a particular application or customer requirement. For example, some devices 100 may be more sensitive to high temperatures so the threshold value line 222 may be moved lower to turn the fan 104 on sooner. In another example, the customer may be willing to tolerate a higher temperature to save on energy costs so the threshold value line 222 may be set higher so the fan 104 comes on later and less frequently.

Figure 3:
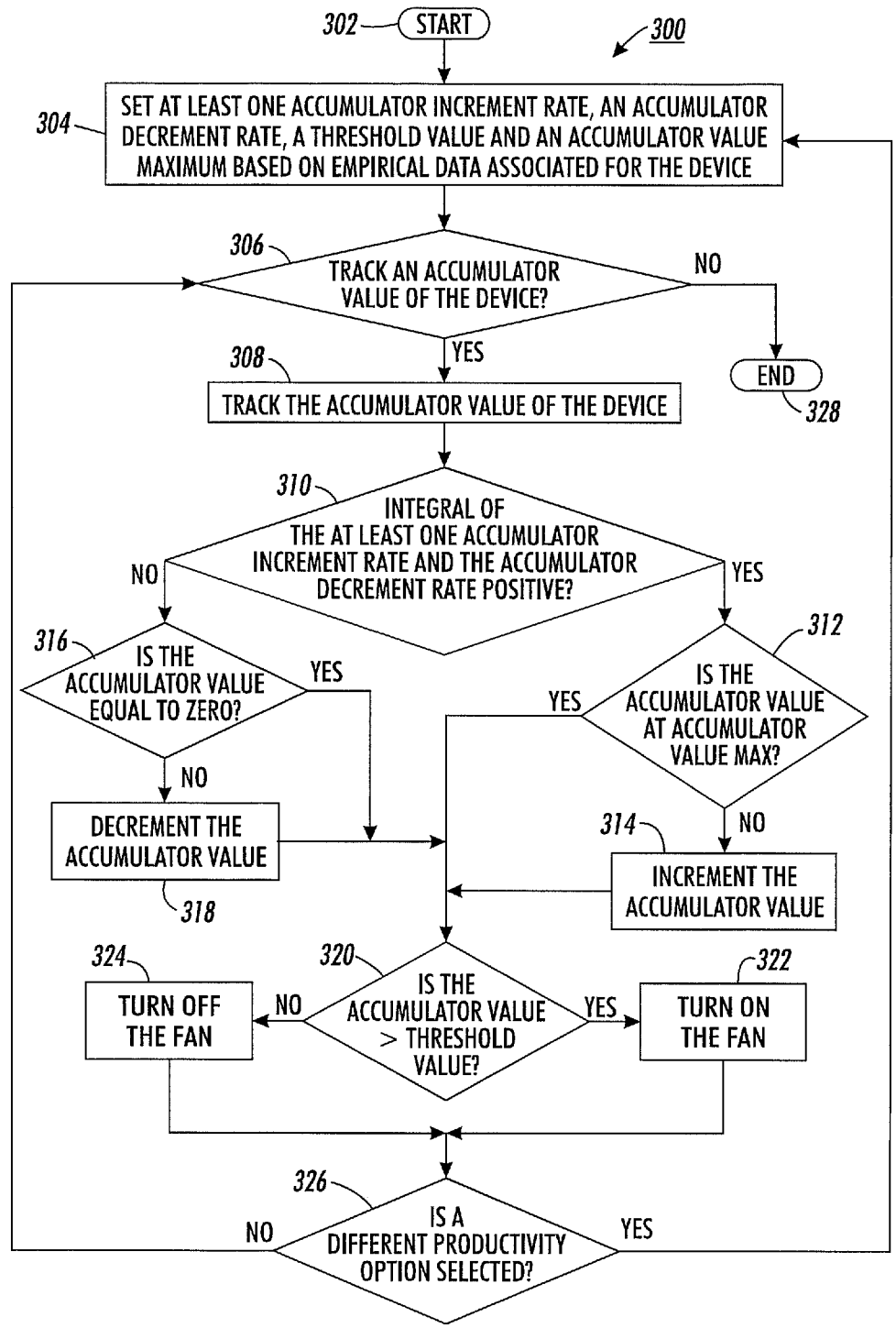
FIG. 3 illustrates an example flowchart of one embodiment of a method for cooling a device based on productivity of the device.
Figure 4:
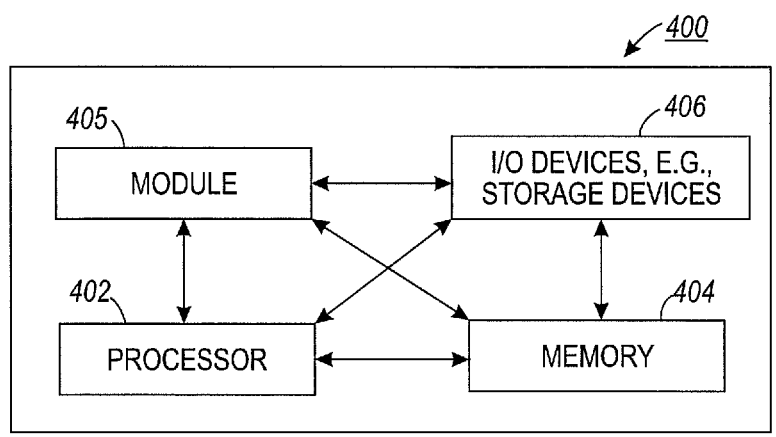
FIG. 4 illustrates a high-level block diagram of a general-purpose computer suitable for use in performing the functions described herein.

FIG. 3 illustrates a flowchart of a method 300 for cooling a device. In one embodiment, one or more steps or operations of the method 300 may be performed by the device 100 or a general-purpose computer as illustrated in FIG. 4 and discussed below.

At step 302 the method 300 begins. At step 304, the method 300 sets at least one accumulator increment rate, an accumulator decrement rate, a threshold value and an accumulator value maximum based on empirical data associated for the device. In one embodiment, empirical data may comprise a temperature of an environment the device is located (e.g., the temperature of the office that the device is located at), a heating rate of the device during operation in the environment, a cooling rate of the device when the device is idle in the environment, an effective time period of operation of the fan, and the like.

For example, the device may be a printer that typically operates in an environment at 25° C. Empirical data regarding how quickly the printer heats up or a rate of temperature change per sheet of paper being printed or during an idle state in the environment at 25° C. may be collected. The rate of temperature change may be converted to the accumulator increment rate and the accumulator decrement rate.

For example, the printer may print one sheet of paper per second and it may be determined that at one sheet of paper per second the printer has an accumulator increment rate of one increment per second. In one embodiment, different productivity options may each have a different accumulator increment rate. For example, the printer may have different printing speeds. Thus, when printing at one sheet per second the accumulator increment rate may be one increment per second, but when printing at five sheets per second the accumulator increment rate may be 2 increments per second. In another example, when performing double sided copies or prints, the accumulator increment rate may be 3 increments per second, and so forth.

In one embodiment, the accumulator increment rate may be set based on the productivity option that is selected. Using the above example, if single sided printing at one sheet per second is selected, the method 300 may set the accumulator increment rate to one increment per second.

In one embodiment, the printer may be monitored to see how quickly the printer cools. For example, it may be measured that the temperature cools at a rate that is equivalent to 0.5 decrements per second.

In one embodiment, the threshold value may be a value that determines when the fan should be turned on within the device. The threshold value may be set to any value depending on a type of device, a particular application, an operating environment, a customer need, and the like. For example, the threshold value may be set to 50 in one example.

In one embodiment, the accumulator value maximum may be based on how long operation of a fan is effective at cooling the heat generating module within the device in view of other constraints (e.g., using more power as the fan continues to run). For example, using the above example, it may be determined that a fan has effectiveness for 30 seconds. Thus, the accumulator value maximum may be set to 65 for a printer having an accumulator decrement rate of 0.5 per second. In other words, the accumulator value maximum may be considered to be a point where even if the temperature were to keep rising, keeping the fan on is not necessarily effective. In one embodiment, the minimum accumulator value may be zero.

At step 306, the method 300 determines whether the accumulator value of the device should be tracked. For example, the device may be turned off or the temperature control may be turned off for maintenance or other reasons. If the answer to step 306 is no, the method may proceed to step 328 where the method 300 ends.

However, if the answer to step 306 is yes, then the method may proceed to step 308. At step 308, the method 300 tracks the accumulator value of the device.

At step 310, the method 300 determines if an integral of the at least one accumulator increment rate and the accumulator decrement rate is positive. In one embodiment the integral may be defined as a sum of the at least one accumulator increment rate and the accumulator decrement rate at a point in time. Using the above printer example, if the printer is operating at one sheet per second, the integral of the accumulator increment rate and the accumulator decrement rate may be 0.5 (e.g., 1.0+−0.5=0.5). Thus, the integral of the at least one accumulator increment rate and the accumulator decrement rate would be positive.

Alternatively, if the printer were in an idle state and not printing or operating, the integral would be −0.5 (e.g., 0.0+−0.5=−0.5). Thus, the integral would be negative.

If the integral of the at least one accumulator increment rate and the accumulator decrement rate is positive, the method 300 may proceed to step 312. At step 312, the method 300 determines if the accumulator value is at an accumulator value maximum. If the answer is yes, the method 300 may proceed to step 320. In other words, the accumulator value is not incremented higher because the accumulator value is already at the maximum value.

If the answer is no, the method 300 may proceed to step 314. At step 314, the method 300 increments the accumulator value by the integral value. Using the above printer example, if the accumulator value begins at zero then one second later the accumulator value would now be 0.5. In another example, if the accumulator value at time t−1 was 20, then the accumulator value at time t would be 20.5 and not simply 0.5. The method 300 then proceeds to step 320.

Referring back to step 310, if the integral of the at least one accumulator increment rate and the accumulator decrement rate is not positive (i.e., the integral is negative), the method 300 proceeds to step 316. At step 316, the method 300 determines if the accumulator value is equal to zero. If the answer is yes, the method 300 proceeds to step 320. In other words, the accumulator value cannot be decremented lower that the minimum value of zero.

If the answer is no, the method 300 proceeds to step 318. At step 318, the method 300 decrements the accumulator value. Using the above printer example, if the accumulator value is at 20 at time t−1, then at time t the accumulator value would be changed to 19.5. The method 300 then proceeds to step 320.

At step 320, the method 300 determines if the accumulator value is greater than the threshold value. If the accumulator value is greater than the threshold value, then the method proceeds to step 322. At step 322, the method 300 turns on the fan or the fan may remain on if the accumulator value was previously above the threshold value. The method 300 then proceeds to step 326.

Referring back to step 320, if the accumulator value is below the threshold value, the method proceeds to step 324. At step 324, the method 300 turns the fan off or the fan may remain off if the accumulator value was previously below the threshold value. The method 300 then proceeds to step 326.

It should be noted that at step 320, operating the fan on or off is controlled irrespective of whether the device is in an operating state or an idle state. In other words, the productivity of the device generates an accumulator value and the fan is operated based upon the accumulator value and not whether the device is operating or idle.

At step 326, the method determines if a different productivity option is selected. If a new productivity option is selected (e.g., the rate of printing is increased from one sheet per second to five sheets per second), the method 300 may return to step 304, where the method 300 sets the accumulator increment rate of the newly selected productivity option. In other words, the method 300 may dynamically change the accumulator increment rate on the fly based on a productivity option that is selected.

If at step 326 no new productivity option is selected, the method 300 may return to step 306 to determine whether the method 300 should continue to track the accumulator value of the device. If tracking should continue, the method 300 may repeat steps 308-326.

In one embodiment, the method 300 may continue to track the accumulator value until the answer to step 306 is no. In one embodiment, the accumulator value continues to be tracked and is continuously changed or updated irrespective of whether the device is in an operating state or in an idle state.

For example, even if the device is in an idle state, the accumulator value may have risen above the threshold value and the fan may remain on until the accumulator value falls below the threshold value. In addition, when the device is transitioned from the idle state to an operating state, the accumulator value does not start from zero, but rather from the current accumulator value.

To illustrate, using the above printer example, the printer may print one sheet per second for 120 seconds and begin with an accumulator value of zero. After 120 seconds, the accumulator value rises to 60. The fan turns on when the accumulator value passes the threshold value of 50. The printer is transitioned to an idle state for 40 seconds and the accumulator value is decremented at a rate of 0.5 per second back down to an accumulator value of 40. Thus, the fan turns off again when the accumulator value falls below the threshold value of 50. When the printer turns on again to print at one sheet per second, the accumulator value would begin at 40 and within 20 seconds, the threshold value would be exceeded and the fan would turn on again. In other words, the second time the printer was in an operation state, the threshold was exceeded in 20 second rather than the 120 seconds when the printer was initially turned on and the accumulator value began with a value of zero.

As a result, the embodiments of the present disclosure improve the technology of devices (e.g., printing devices). The temperature control of devices, such as printing devices, are improved to allow an internal fan to be controlled based on productivity that does not require additional interfaces, wiring or equipment (e.g., a temperature sensor). The functions of the device are improved to lower an internal temperature by controlling a fan based on the productivity of the device.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises one or more hardware processor elements 402 (e.g., a central processing unit (CPU), a microprocessor, or a multi-core processor), a memory 404, e.g., random access memory (RAM) and/or read only memory (ROM), a module 405 for cooling a device, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the general-purpose computer may employ a plurality of processor elements. Furthermore, although only one general-purpose computer is shown in the figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for cooling a device (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations", this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for cooling a device (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for cooling a device, comprising:
    determining, by a processor, a rate of heating per sheet per second when the device is printing;
    determining, by the processor, a rate of cooling per second when the device is idle;
    associating, by the processor, an accumulator increment rate based on the rate of heating per sheet;
    associating, by the processor, an accumulator decrement rate based on the rate of cooling;
    tracking, by the processor, an accumulator value continuously for the device irrespective of whether the device is in an operating state or an idle state, wherein the accumulator value is adjusted based on a difference of the accumulator increment rate and the accumulator decrement rate when the device is printing and only the accumulator decrement rate when the device is idle;
    turning on, by the processor, a fan when the accumulator value exceeds a threshold value, wherein the fan remains on even when the device is in the idle state until the accumulator value falls below the threshold value; and
    turning off, by the processor, the fan when the accumulator value falls below the threshold value, wherein the fan remains off even when the device is in the operating state until the accumulator value exceeds the threshold value again.

2. The method of claim 1, wherein the accumulator increment rate, the accumulator decrement rate and the threshold value are based on empirical data, the empirical data comprising a temperature of an environment that the device is located, the rate of heating of the device during operation in the environment, the rate of cooling of the device when the device is idle in the environment and an effective time period of operation of the fan.

3. The method of claim 1, wherein the accumulator increment rate comprises one of a plurality of different accumulator increment rates for each one of a plurality of different productivity options of the device.

4. The method of claim 3, wherein the accumulator increment rate that is used in the tracking is based on a productivity option of the plurality of different productivity options that is selected.

5. The method of claim 3, wherein the accumulator increment rate is dynamically changed during the tracking as different ones of the plurality of productivity options are selected.

6. The method of claim 1, wherein the integral of the accumulator increment rate and the accumulator decrement rate comprises a sum at a point in time.

7. The method of claim 1, wherein the tracking further comprises:
increasing, by the processor, the accumulator value when the integral of the accumulator increment rate and the accumulator decrement rate is positive at a point in time.

8. The method of claim 1, wherein the tracking further comprises:
decreasing, by the processor, the accumulator value when the integral of the accumulator increment rate and the accumulator decrement rate is negative at a point in time.

9. The method of claim 1, wherein the tracking begins from a current accumulator value when the device transitions from the idle state back to the operating state at a later time.

10. A non-transitory computer-readable medium storing a plurality of instructions which, when executed by a processor, cause the processor to perform operations for cooling a device, the operations comprising:
determining a rate of heating per sheet per second when the device is printing;
determining a rate of cooling per second when the device is idle;
associating an accumulator increment rate based on the rate of heating per sheet;
associating an accumulator decrement rate based on the rate of cooling;
tracking an accumulator value continuously for the device irrespective of whether the device is in an operating state or an idle state, wherein the accumulator value is adjusted based on a difference of the accumulator increment rate and the accumulator decrement rate when the device is printing and only the accumulator decrement rate when the device is idle;
turning on a fan when the accumulator value exceeds a threshold value, wherein the fan remains on even when the device is in the idle state until the accumulator value falls below the threshold value; and
turning off the fan when the accumulator value falls below the threshold value, wherein the fan remains off even when the device is in the operating state until the accumulator value exceeds the threshold value again.

11. The method of claim 10, wherein the accumulator increment rate, the accumulator decrement rate and the threshold value are based on empirical data, the empirical data comprising a temperature of an environment that the device is located, the rate of heating of the device during operation in the environment, the rate of cooling of the device when the device is idle in the environment and an effective time period of operation of the fan.

12. The method of claim 10, wherein the accumulator increment rate comprises one of a plurality of different accumulator increment rates for each one of a plurality of different productivity options of the device.

13. The method of claim 12, wherein the accumulator increment rate that is used in the tracking is based on a productivity option of the plurality of different productivity options that is selected.

14. The method of claim 12, wherein the accumulator increment rate is dynamically changed during the tracking as different ones of the plurality of productivity options are selected.

15. The method of claim 10, wherein the integral of the accumulator increment rate and the accumulator decrement rate comprises a sum at a point in time.

16. The method of claim 10, wherein the tracking further comprises:
increasing, by the processor, the accumulator value when the integral of the accumulator increment rate and the accumulator decrement rate is positive at a point in time.

17. The method of claim 10, wherein the tracking further comprises:
decreasing, by the processor, the accumulator value when the integral of the accumulator increment rate and the accumulator decrement rate is negative at a point in time.

18. The method of claim 10, wherein the tracking begins from a current accumulator value when the device transitions from the idle state back to the operating state at a later time.

* * * * *